United States Patent Office 3,553,718
Patented Jan. 5, 1971

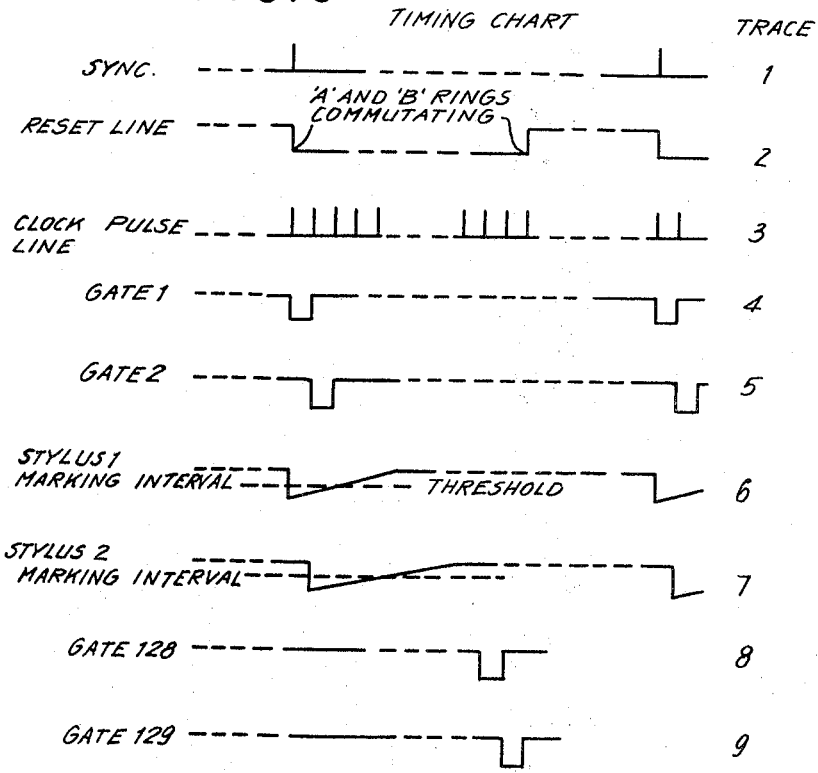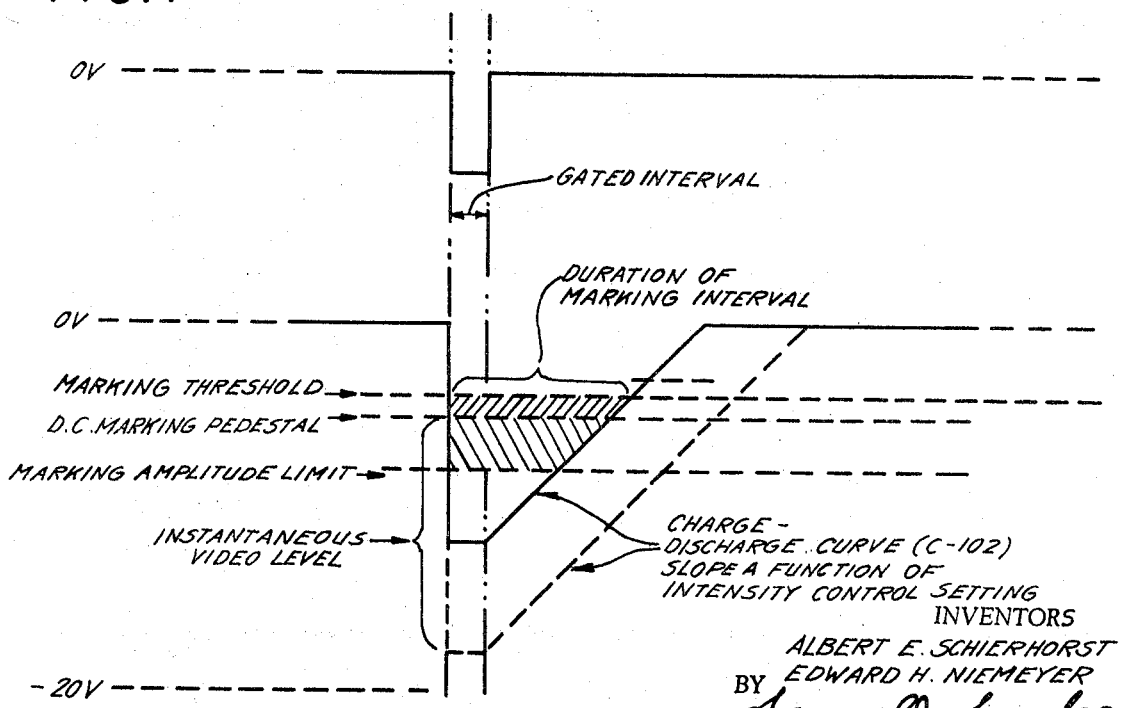

3,553,718
MULTIPLE STYLUS ELECTROLYTIC RECORDER
Albert E. Schierhorst, Beltsville, and Edward H. Niemeyer, Cheverly, Md., assignors, by mesne assignments, to International Telephone and Telegraph Corporation, a corporation of Delaware
Continuation of application Ser. No. 474,585, July 26, 1965. This application June 20, 1969, Ser. No. 836,221
Int. Cl. G01d 15/06; H04r 1/24
U.S. Cl. 346—74
9 Claims

ABSTRACT OF THE DISCLOSURE

An electrolytic signal recorder having a plurality of recording heads, each head having multiple styli, and a cable connector having a plurality of contacts positioned to register with and engage all the styli individually. A recording medium is drawn between said styli and a consumable electrode, including a gating circuit for activating successive styli sequentially and a stylus driver circuit associated with each stylus for providing a constant amplitude current pulse, the duration of which is proportional to the amplitude of the signal to be recorded, whereby the shading of the recording represents the amplitude of the signal.

---

Figure 1:
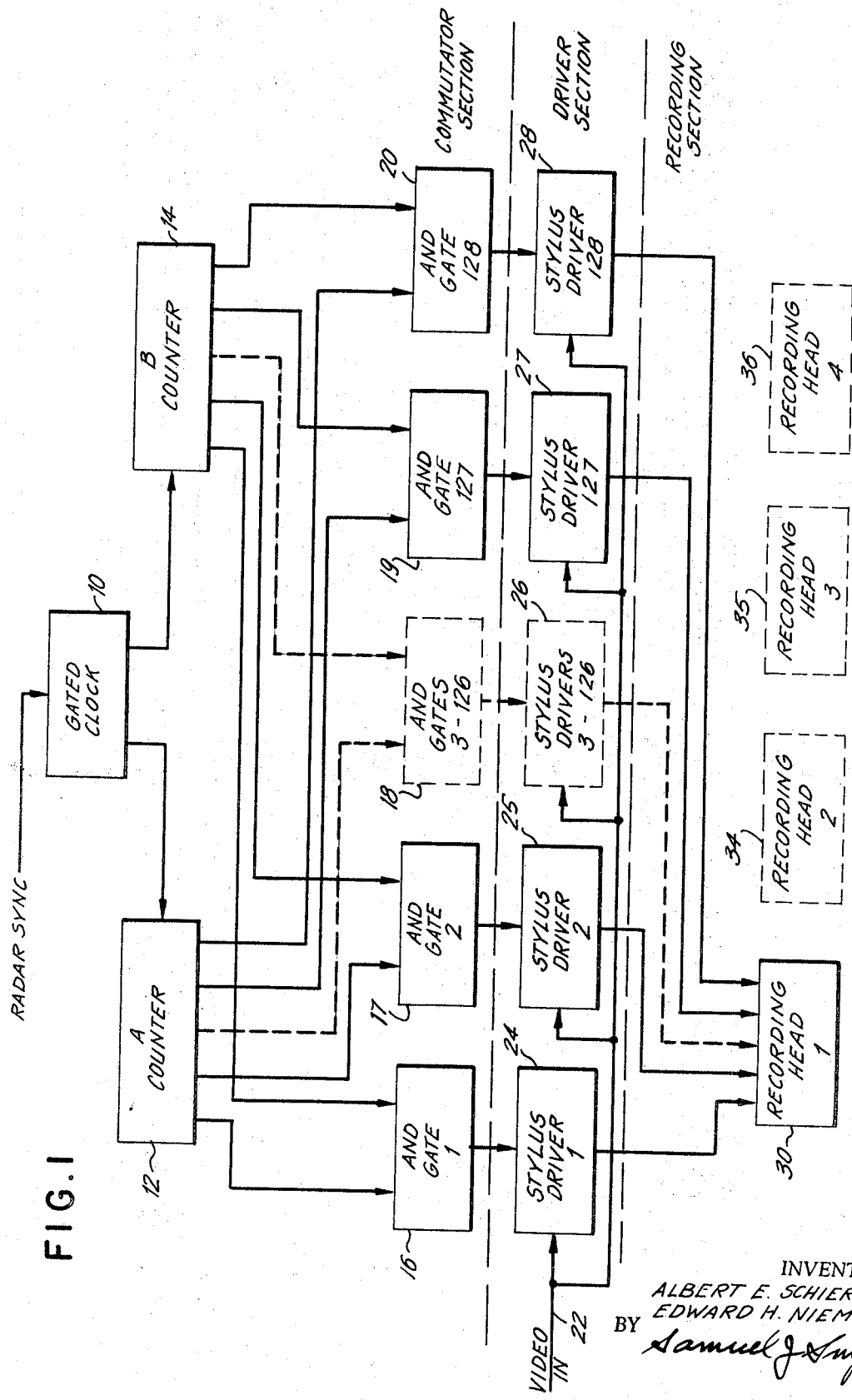

The instant case is a continuation of U.S. patent application Ser. No. 474,585, filed July 26, 1965, and now abandoned.

This invention relates to a multiple stylus recording system for making immediate indelible recordings of amplitude modulated signals, preferably by electrolytically depositing dye-producing ions on a paper web to provide marks having a long grey scale.

The recorder of the instant invention is useful for many types of signals and where immediately visible recordings are desired. It may be used, for example, to record radar backscatter, ionosphere and vertical sounder signals, and multiple filter analyzer signals, or to make facsimile recordings.

One embodiment of the invention shown and described herein has four channels and it will be assumed, for the sake of definiteness, that each is connected to display radar signals. In each channel a pair of ring counters is gated to run for 129 counts in an interval equal to the desired sweep width of the radar display. The counter output is decoded and used to gate sequentially 128 driver stages, whose output is wired point-to-point, to 128 separate recording styli. Each array of 128 active styli is mounted as a set in a recording head. Handling is thus facilitated, and a means of rapidly disconnecting the head from its mount and cable connector is provided. Each driver stage produces a marking pulse whose duration is directly related to the instantaneous amplitude of the radar or other video input during the sequentially gated interval. At count 129, the counters automatically reset and await the next system trigger or synchronizing pulse. Controls are provided to select and adjust the time base or sweep interval and to set the channel signal and background levels. External synchronization of the sweep enables recording of data not synchronized with the recorder mechanical drives.

A moist electrolytic paper web is interposed between an expendable top electrode and the four recording heads. Spring mounting of the heads assures a continuous series circuit between each stylus, the recording paper, and the top electrode.

Electrolysis, caused by the flow of signal current from the top electrode through the chemically impregnated paper, transfers metallic ions from the top electrode to the paper, where chemical reaction causes immediate indelible dye marks to form. The electrolytic marking process provides a record having wide dynamic range capable of representing the amplitude of the signals, and one that remains environmentally stable. The ranges of marking pulse widths, electrode dimensions, and paper feed rates conspire to allow current integration to be applied to any element of the recording in the attainment of a long grey scale.

The object of the invention is to provide an improved recorder for recording, immediately and visibly, rapidly occurring signals so as to display their position and amplitude, as well as their time of occurrence. Another object of the invention is to provide a permanent, high capacity record which is free of such latent effects as bleeding or growth or loss of contrast, which would impair the definition or magnitude of the recorded signals.

A further object of the invention is to provide a recorder which is rugged and not damaged by handling.

Still another object of the invention is to record data on straight horizontal lines to give a true rectangular record.

Another object is to utilize an electronic sweep for achieving a greater range of integration of marking than is attainable by recordings having mechanical sweep.

Another object is to provide a recorder which does not require the data to be synchronized with the record.

Figure 2:
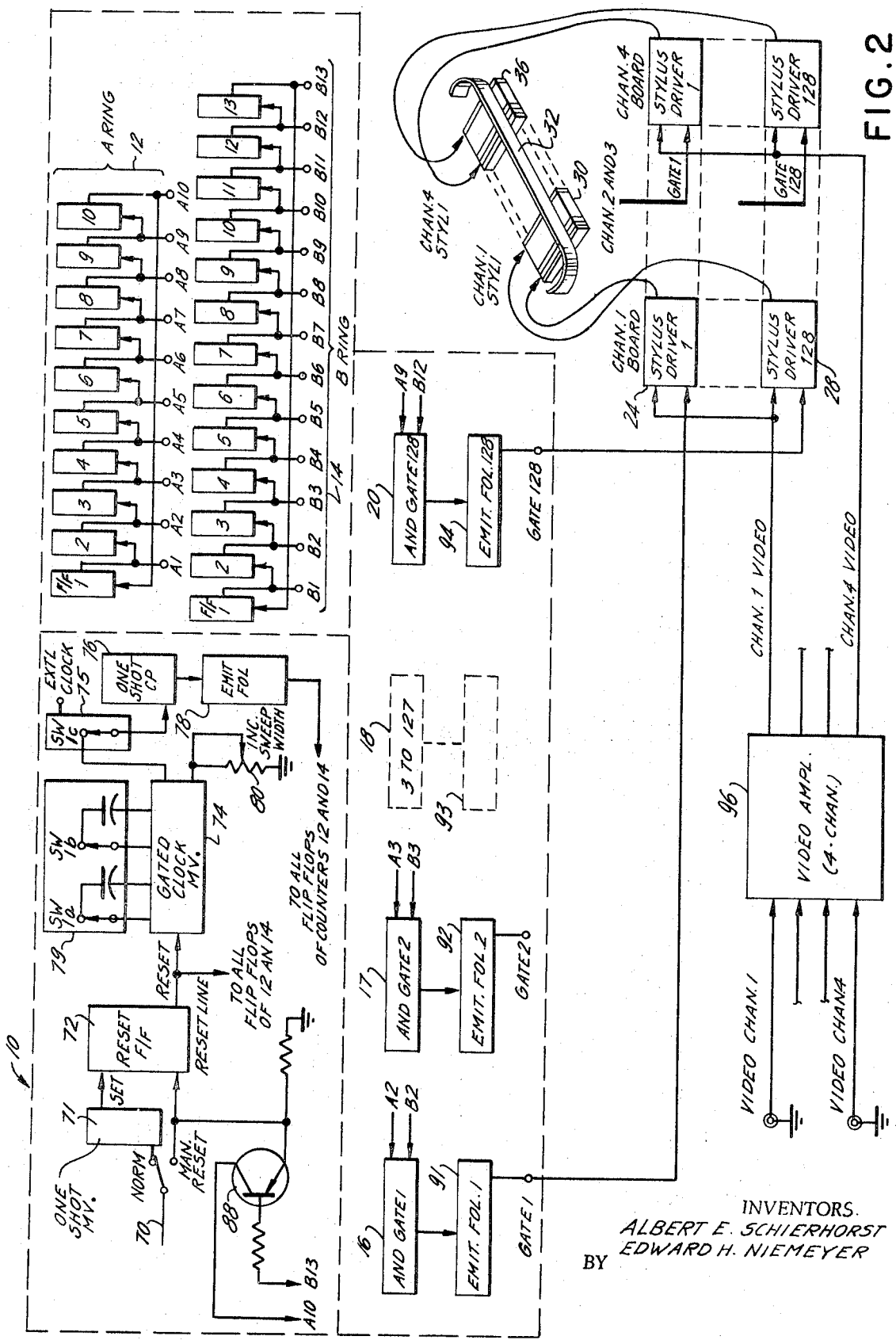
Figure 3:
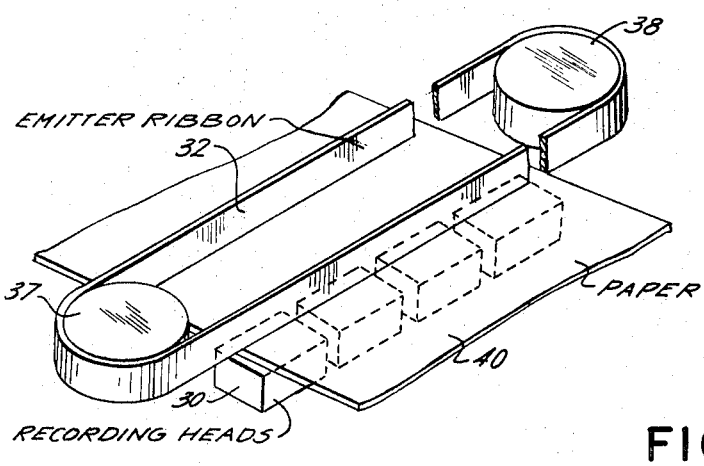
Figure 8:
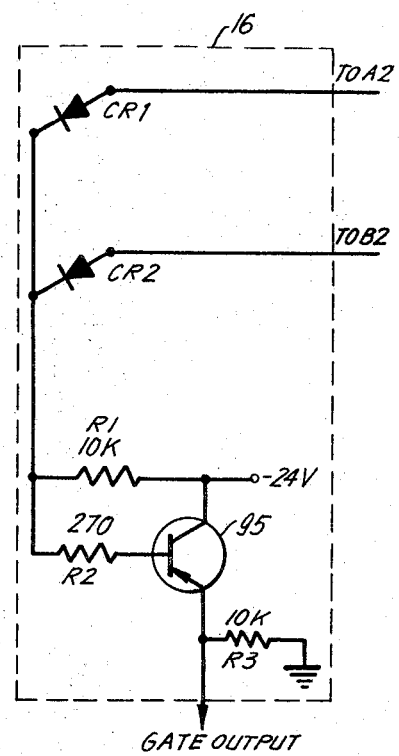
Figure 6:
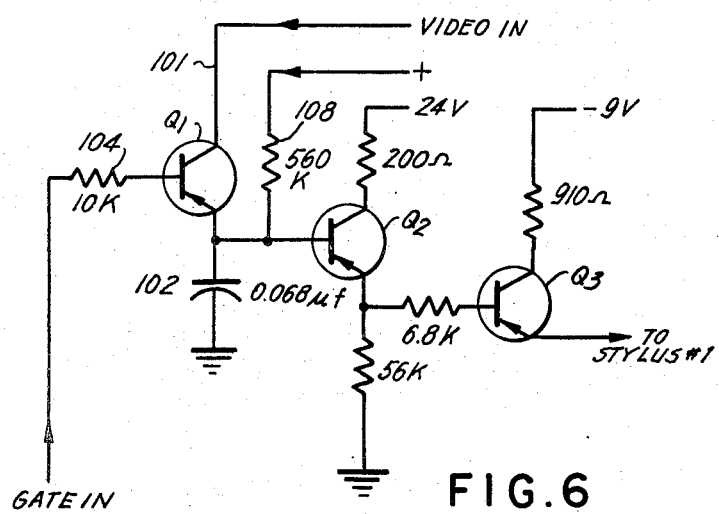

The invention will be fully understood from the following description and the drawing, in which:

FIG. 1 is a simplified block diagram of the recorder.
FIG. 2 is a diagram of the circuitry of the recorder.
FIG. 3 is a schematic view of the emitter ribbon, paper, and recording heads.
FIGS. 4 to 4B are perspective views of recording head assemblies.
FIG. 5 shows graphs of the timing of various circuits.
FIG. 6 is a circuit diagram of one of the stylus drivers.
FIG. 7 shows curves illustrating the operation of the driver circuit of FIG. 6.
FIG. 8 is a circuit diagram of one of the AND gates.

Referring to FIG. 1, it can be seen the recorder consists essentially of three sections, namely, a gating or commutator section, a stylus driver section, and a recording section. The gating section includes clock circuits 10 supplied with trigger pulses, which may be synchroning pulses derived from a radar system whose received signals are to be recorded. The output pulses of clock circuit 10 drive two ring counters 12 and 14. These counters are connected to control 128 AND gates 16–20 sequentially. The gates sequentially switch signals at an input 22 through driver circuits 24–28 to a recording head 30 having 128 styli. The return path for the signals impressed on the styli is through a common emitter ribbon 32 (FIG. 3). In the embodiment of the invention herein disclosed four recording heads 30, 34–36 are provided, each recording head being connected to a circuit identical to that shown in FIG. 1. Ribbon 32 is preferably a stainless steel loop mounted on pulleys 37 and 38, one of which is driven, so that one edge of the ribbon is adjacent the recording heads and slowly traverses them. The electrolytic recording paper 40 is fed between ribbon 32 and the recording heads 30, 34–36, as shown in FIG. 3.

Figure 4A:
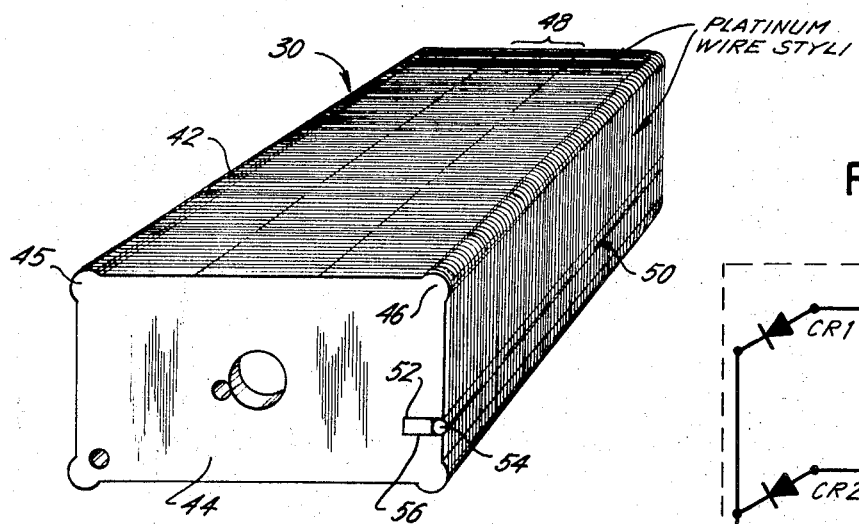
Figure 4B:
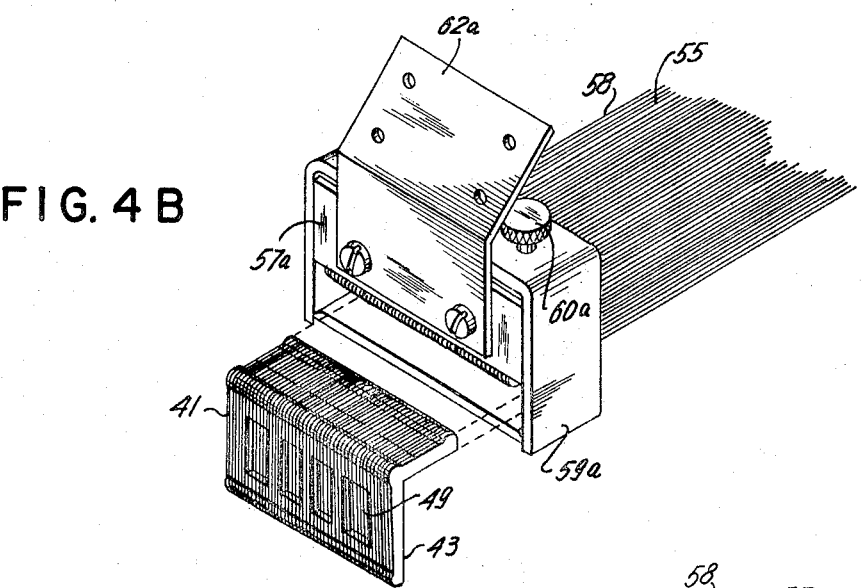
Figure 4:
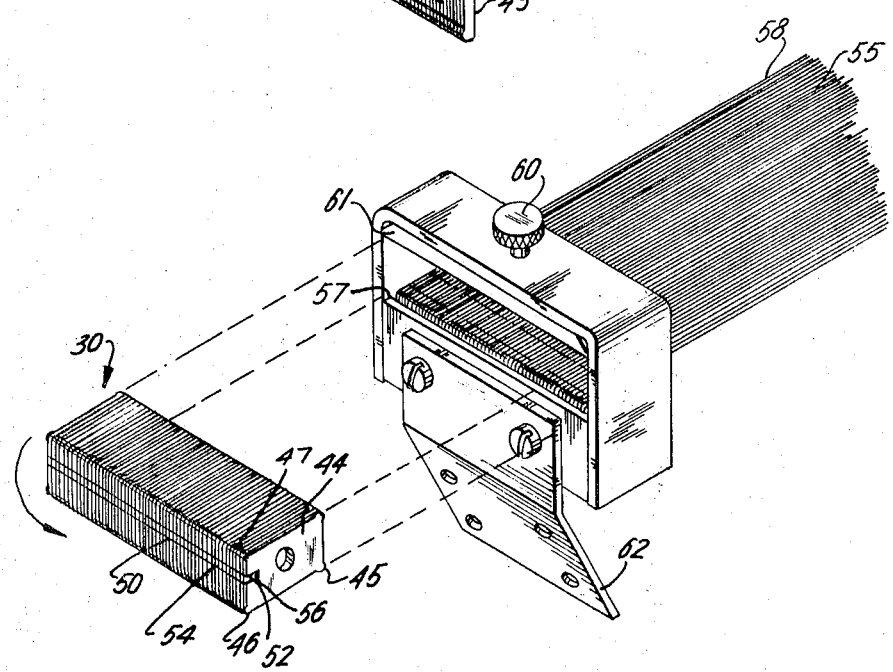

Each recording head, in the embodiment of FIGS. 4 and 4A, provides fixed styli 42 mounted on a glass filled plastic block 44 having protruding rounded corners 45, 46, 47, etc. The styli are provided by an accurately spaced, uniformly tensioned array of 128 parallel platinum wires 42 lying along two sides of block 44 and bonded to three corners 45, 46, and 47. The top surface wires provide the paper contact area or writing area 48 and the side surface of the wires provide the contact or feed area 50. A groove 52 runs the length of the block beneath the wires at the contact area 50. A resilient plastic cording 54 and a relatively rigid strip 56 are placed in groove 52 and raise the wires slightly in the contact area 50. A flat cable 58 containing a feed wire 55 for each stylus is adapted to connect the recording head to the stylus drivers 24–28. The cable terminates in a contact block 57 having exposed ends of the feed wires bonded to one face thereof for engaging the contact area 50 of wires 42. The recording head 30 and receptacle 57 are held in a clamp assembly 59 having a clamping screw 60, preferably acting in conjunction with a flexible bar 61. A mounting plate 62 is fastened to clamp assembly 59 and is adapted to be spring mounted for adjustable vernier positioning of the entire assembly in the recorder resiliently.

FIG. 4B shows a recording head similar to that of FIG. 4, having 128 styli consisting of a like number of platinum alloy wires 41 mounted on an L-shaped support or frame 43, which may be of anodized aluminum. Wires 41 are accurately spaced and uniformly tensioned and extend around the two outer sides of frame 43, which has rounded protruding edges or corners holding wires 41 spaced from the sides of support 43. The wider side of frame 43 has a number of cutouts 49 for ventilation. Wires 41 are bonded to the frame 43 at the outer edges thereof. Cable 58, which may be the same as that connected to the recording head of FIGS. 4 and 4A, has one feed wire 55 for each stylus and terminates in connector 57a at one end and in any suitable connector (not shown) at its other end. The individual contacts of connector 57a are actual extensions of feed wires 55. The contact area of each wire 55 is bonded to one face of connector 57a and each wire is precision machined to a flat whose width is equal to the original diameter, forming the multiple contact area 110 (FIG. 4). The overall finished contact area of connector 57a is cylindrically convex. The surfaces of all wire contacts are rhodium plated for best contact characteristics and long time corrosion resistance.

The L-shaped head of FIG. 4B has a number of important advantages. Two L-shaped frames 43 may be placed together in a jig to form a rectangular box. Wire 41 is then wound on the two frames in a continuous helix, and each turn is bonded to the three edges of both frames. The wire is then severed at the junctures of the frames between the bonds to produce two recording heads, without any waste of the expensive wire. The wire forming the styli is preferably an alloy of 80% platinum, 15% rhodium, and 5% ruthenium. The wire may be wound 64 turns to an inch to give 128 styli on a two-inch frame, but other and even closer spacings can be achieved and utilized with the cable connector technique described above. These recording heads have good wearability as well as providing a high density of recorded data.

The connector block 57a is surrounded by a stainless steel clamp 59a and held therein by screws 60a. One side of the L-shaped recording head is slipped into place adjacent the connector block, thumb screw tightened, and thus all contact pairs of the recording head and cable connector are mated in registry. Uniform contact pressure is assured by a resilient plastic cording, similar to cording 54 of FIG. 4, which lies beneath the wires and along the contact area of the recording head. A spring plate 62a is fastened to the recording head assembly by screws and is used for mounting the recording head assembly.

The recording paper 40 passes over the wide side of the recording head, as shown in FIG. 3. Paper 40 is in the form of a web and is fed from a roll to a driven take-up roller (not shown) in a manner well known in the art. Electrolytic recording paper Type 63A1 manufactured by Hogan Faximile Corporation, New York, N.Y., has been found suitable. The characteristics of this type of recording paper are described in Pat. 2,953,505 assigned to Hogan. The paper may be fed at speeds of 0.4 to 8.0 inches per minute, so that 100 foot roll of paper has a recording time of 50 to 2.5 hours.

The commutating and driving circuitry is shown in FIG. 2. Although the recorder includes four channels, the circuits of only one channel need be described. Synchronizing pulses are applied to terminal 70 and fed to a monostable multivibrator 71, the output of which sets reset generator 72 the output of reset generator 72 enables clock multivibrator 74, which then supplies pulses to one shot multivibrator 76, which in turn is connected to emitter follower 78. Switch 75 is provided to enable multivibrator to be connected to an external source of clock pulses, instead of clock multivibrator 74. Clock circuit 74 is provided with a sweep width selector 79 and a sweep width vernier control 80. The output of reset generator 72, in its set condition, is connected to all stages of counters 12 and 14 to unclamp them, and the output of emitter follower is connected to all stages of the counters 12 and 14 for stepping the counters.

The two ring counter circuits 12 and 14 provide 128 sequential gate signals. One counter has 10 stages (the "A" ring), while the other has 13 stages (the "B" ring). In both counters, all stages are identical saturated bistable circuits. Each counter is connected in the closed loop or ring configuration. Since the initial or reset position of the rings is with only the first counter stages (A1 and B1) in the "reset" state, it is the reset function that is propagated from stage to stage with the application of clock pulses. In providing 130 counts, the "A" ring must circulate 13 times while the "B" ring circulates 10 times. All output lines (A1 through A10 and B1 through B13) are connected to circuit board terminations to be decoded externally by the diode matrix board 82. It is the "0" output of the counter bistable circuits that is decoded and used sequentially to provide time base gate signals to the stylus driver stages. Each "0" output goes from 0 to approximately −20 volts while that stage is in the reset mode, and returns to 0 volts when that stage is again set by the next clock pulse.

Since the numbers 10 and 13 may be regarded as mutually prime or without a common factor, any given pair of outputs of the "A" and "B" ring counters is simultaneously available once in every 130 steps. In deriving the end-of-count input for the reset generator, clock pulse 129 causes negative signals (A10 and B13) to be applied to gate 88. With the reset thus primed, clock pulse 130 returns gate 88 to the quiescent state. This positive transition serves to reset the reset generator 72, thereby disabling clock multivibrator 74 and, stopping the clock pulses, and resetting counters 12 and 14.

As previously noted in connection with FIG. 1, the commutator section for each channel contains 128 AND gates 16–20, not including gate 88, which initiates reset. Each of these 128 AND gates receives an input from one stage of the 10-stage ring counter 12 and one stage of the 13-stage ring counter 14. When the positions of these counters correspond to the number of a particular gate both inputs of the gate are enabled, and the gate senses this coincidence of inputs and produces an output. The output of each gate is fed, through an emitter follower 91–94, to the corresponding stylus driver 24–28 in the driver section. The circuit of an AND gate is shown in FIG. 8. Assuming this is gate No. 1, it is connected to terminals A2 and B2 of counters 12 and 14. Diodes CR1 and CR2 pass negative gating signals from the counters to the base of transistor 95 through resistor R2 to enable this gating circuit upon coincidence of the gating signals. Upon being enabled, the emitter of gate 16 supplies a gating signal to emitter follower 91. The gates may be gated according to the following scheme.

| Gate No. | Counter terminals | |
|---|---|---|
| | A | B |
| 1 | 2 | 2 |
| . | . | . |
| 9 | 10 | 10 |
| 10 | 1 | 11 |
| 11 | 2 | 12 |
| 12 | 3 | 13 |
| 13 | 4 | 1 |
| . | . | . |
| 19 | 10 | 7 |
| 20 | 1 | 8 |
| . | . | . |
| 25 | 6 | 13 |
| 26 | 7 | 1 |
| . | . | . |
| 127 | 8 | 11 |
| 128 | 9 | 12 |

The outputs of emitter followers 91–94 are the 128 gating signals for stylus drivers 24–28 (FIG. 1) and, therefore, the output terminals of the emitter followers are labeled Gate 1 to Gate 128. These terminals are connected to the 128 stylus drivers 24–28 of channel 1. The signals to be recorded are received in four separate channels and assuming they are video signals, they are impressed on a four-channel video amplifier 96, and its channel 1 outputs are impressed in all channel 1 stylus drivers 24–28, and its other outputs are impressed, respectively, on the video inputs of the channels 2, 3, and 4 stylus drivers. The gated video outputs of the 128 stylus drivers of each channel are fed to the 128 styli of each recording head, respectively.

The stylus driver circuits 24–28 are required to provide:

(a) a gated sensing of the video voltage
(b) an amplitude-to-time conversion of the gated video and isolation of the time converted signal.
(c) an amplitude-limited current driver.

The driver circuit for one stylus is shown in FIG. 6 and the function of the circuit is shown by the chart of FIG. 7. The common video bus 101 of channel 1 impresses the instantaneous video voltage on the collector of transistor Q1 and thereby causes charging capacitor 102 during the interval of the gate pulse applied to the base through resistor 104. Peak charging of storing capacitor 102 to value determined by the video signal occurs during the first 3 microseconds of the gated interval. As shown in FIG. 7 marking or recording occurs only during the interval that the voltage charge on capacitor 102 exceeds the marking threshold which is about five volts. Sensitivity is set by controlling the slope of the discharge curve of capacitor 102 and thus controlling the duration of marking pulses. A positive control voltage, inversely related to an intensity control setting (not shown) is applied by a common bus 106 through resistor 108 to the base of transistor Q2, so that the minimum setting of the intensity control provides the maximum positive voltage and thus the minimum marking pulse width, resulting from the steepest discharge slope of capacitor 102. The solid and the dashed discharge curves in FIG. 7 shows that different video signal levels give different, and nearly proportional, marking or recording durations. Since the paper travel is slow enough to permit integration of the recording, the marking density is nearly proportional to the amplitude of the recorded signal. As is well known by those skilled in the electrolytic recording art, the desired markings are made on the paper web by electrolytically depositing dye-producing ions drawn from the consumable electrode onto said web. It is also well known by those skilled in the art that the density or darkness of a mark created by the aforementioned deposition is proportional to the number of ions deposited on the paper. It, therefore, follows that if, as in the instant case, the paper is relatively stationary with respect to the applied video frequency signal (the paper moving at speeds of 0.4 to 8 inches per minute), during the period when ions are deposited and the rate of deposition is constant, the darkness or density of the mark created is proportional to the length of time frequency signal (the paper moving at speeds of 0.4 to 8 inches per minute), during the period when ions are deposited and the rate of depositions is constant, the darkness or density of the mark created is proportional to the length of time during which said ions are deposited.

The circuit of transistor Q3 is connected to the emitter of Q2 and provides current amplification of the signals passed by the Q2 stage. The collector voltage of Q3 exceeds the marking threshold by only a few volts and, thus, limits the amplitude of all but very small marking pulses. The amplitude limiting results in marking puses having essentially a rectangular format and, thus, contributes in the attainment of wide dynamic range, since marking duration remains as the principal variable with video signal level. The emitter of transistor Q3 is connected to stylus No. 1 of the first recording head, and every other stylus is similarly connected to like driver stages. All transistors of the driver circuits described above are type 2N404A. The fact that the marking period may be much greater than the gating period for each stylus enables faithful recording of a wide range of video intensity without reducing the gating or recording rate.

An important advantage of this invention is its elimination of the undesirable latent effects which may occur in electrolytic recording. Latent development effects appear to be related to the use of D.C. marking currents particularly when such currents are applied at low potentials or at the lowest marking threshold. One such latent effect is record bleeding, where recorded signal transfer may occur between adjacent layers of rolled or folded recordings. Another latent effect is line growth, where the recorded line spreads in size, increases marking density and causes the reocrding to suffer loss of contrast. Another effect is the appearance of spurious spot marking which confuses the desired recording. The technique used in this invention in the avoidance of latent effects is to provide marking potentials to the recording electrodes that are of a pulse character. The use of marking pulses permits the marking threshold potential to be crossed rapidly and provides a recording which is complete and indelible as initially rendered. The pulse technique is useful in both serial and parallel data entry recorders.

It will be evident that the invention provides a multichannel recorder having negligible processing time, to give an almost instantaneous permanent display. The recorder is obviously capable of rapid recording of pulse or digital information, and is also capable of reproducing a picture, since the markings have a wide grey scale responsive to signal amplitudes, as well as reproducing written or printed matter. Not only can serial data be recorded as heretofore described, but parallel data recording is also possible. If, for example, data is received on a large number of parallel inputs, each connected to one stylus driver, and all said stylus drivers are gated simultaneously, the data will be recorded by the styli simultaneously, or in parallel in response to pulses having an amplitude representative of the amplitude of the data.

Many applications of the invention will be apparent to

We claim:

1. An electrolytic recorder comprising a recording head having a row of fixed styli, a consumable electrode closely juxtaposed to said styli, means for moving an electrolytic recording sheet between said electrode and said styli, means for receiving an electrical signal, means for generating a current pulse having a substantially constant amplitude and a duration proportional to the amplitude of the signal, and means for supplying each current pulse to a stylus, said duration being such that the electrolytic recording sheet is relatively stationary during the application of said current pulse to said stylus, whereby the density of the recording represents the amplitude of the signals.

2. Apparatus according to claim 1, wherein said recording head includes an insulating support member, a plurality of parallel, closely spaced wires each extending along two sides of said member and fastened to said member, whereby each wire constitutes one stylus of the recording head.

3. Apparatus according to claim 2, wherein said support member is a block having outwardly projecting corners extending transverse to the wires for holding them in spaced relation to the sides of the block.

4. Apparatus according to claim 2, wherein the support member has an L-shape and a rounded outward projection at the corner of the L with said wires extending over the two outer sides thereof.

5. Apparatus according to claim 2, wherein a plurality of recording heads are mounted adjacent to one another in a row transverse to the direction of movement of the recording sheet, said consumable electrode being a closed loop metallic tape, and a pair of pulleys supporting said tape with one side of said loop extending across all said recording heads with one edge of the tape adjacent the wires constituting the styli of said recording heads.

6. An electrolytic recorder comprising a row of recording heads having a linear array of fixed styli, an endless belt consumable electrode closely juxtaposed to said styli, means for driving said belt continuously, means for moving an electrolytic recording sheet between said electrode and said styli, means for receiving electrical signals and gating said signals to said styli, said last mentioned means including stylus driver means for sensing the signal amplitude during each gating interval and generating a current pulse having a substantialy constant amplitude and a duration proportional to said signal amplitude, and means for supplying each current pulse to one stylus, said duration being such that the electrolytic recording sheet is relatively stationary during the application of said current pulse to said stylus, whereby the density of the recording represents the amplitude of the signals.

7. An electrolytic recorder comprising a recording head having a row of fixed styli and a consumable electrode closely juxtaposed to said styli, means for moving an electrolytic recording sheet between said electrode and said styli, means for receiving electrical signals and gating said signals to said styli, said recording head including a supporting member consisting of an insulator having an L-shape, a plurality of separate parallel wires stretched over the outer sides of the L-shaped supporting member and having their ends fastened thereto, and a cable connector having a plurality of contacts positioned to engage all said wires individually, the wires stretched over one leg of said L-shaped supporting member being in contact with said electrolytic recording sheet and the wires stretched over the other leg of said L-shaped supporting member registering with and engaging said cable connector contacts.

8. An electrolytic recorder comprising a recording head having a row of fixed styli, a consumable electrode closely juxtaposed to said styli, means for moving an electrolytic recording sheet between said electrode and said styli, means for receiving an electrical signal and gating said signal to said styli, said last mentioned means including stylus driver means for generating, during each gating interval, a marking pulse having an amplitude substantially greater than the marking threshold of the recorder, said stylus driver means generating pulses having a substantially fixed amplitude and a duration proportional to the amplitude of the signal, and means for supplying each marking pulse to one stylus, said duration being such that the electrolytic recording sheet is relatively stationary during the application of said marking pulse to said stylus, whereby latent development effects are substantially eliminated.

9. A recorder according to claim 8, wherein said means for gating the signal, gates said signal to successive styli sequentially.

References Cited

UNITED STATES PATENTS

| | | | |
|---|---|---|---|
| 2,758,906 | 8/1956 | Alden | 346—74 |
| 2,805,114 | 9/1957 | Alden | 346—74 |
| 3,216,020 | 11/1965 | Earthman | 346—74 |
| 2,615,777 | 10/1952 | Deuth | 346—74 |
| 2,969,083 | 1/1961 | Gallentine | 346—74 |

FOREIGN PATENTS 895,349   5/1962   Great Britain   178—6.6

OTHER REFERENCES

G. M. Stamps and H. C. Ressler: A Very High-Speed Facsimile Recorder, December 1959, IRE Transactions on Communication Systems, pp. 257–263.

J. RUSSELL GOUDEAU, Primary Examiner

U.S. Cl. X.R.

178—6.6